llUS011450983B2

(12) United States Patent
Shimoyama

(10) Patent No.: US 11,450,983 B2
(45) Date of Patent: Sep. 20, 2022

(54) HOUSING OF HIGH-SPEED TRANSMISSION CONNECTOR AND HIGH-SPEED TRANSMISSION CONNECTOR

(71) Applicant: Yamaichi Electronics Co., Ltd., Tokyo (JP)

(72) Inventor: Takahiro Shimoyama, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 0 days.

(21) Appl. No.: 17/175,165

(22) Filed: Feb. 12, 2021

(65) Prior Publication Data

US 2021/0257771 A1   Aug. 19, 2021

(30) Foreign Application Priority Data

Feb. 14, 2020   (CN) .......................... 202010092843.4

(51) Int. Cl.
*H01R 12/71*   (2011.01)
*H01R 13/50*   (2006.01)

(52) U.S. Cl.
CPC .......... *H01R 13/50* (2013.01); *H01R 12/716* (2013.01)

(58) Field of Classification Search
CPC ...... H01R 13/50; H01R 12/716; H01R 12/73; H01R 43/18; H01R 12/7052; H01R 13/502; H01R 2201/20; G01B 21/02
See application file for complete search history.

(56) References Cited

U.S. PATENT DOCUMENTS

| 6,179,632 | B1 | 1/2001 | Wu | |
|---|---|---|---|---|
| 8,632,263 | B2 * | 1/2014 | Nekado | ............... G02B 6/4201 385/14 |
| 10,164,361 | B2 * | 12/2018 | Minich | ................. H05K 1/144 |
| 10,405,448 | B2 * | 9/2019 | Rengarajan | .......... H01R 13/514 |
| 2009/0239422 | A1 | 9/2009 | Fukazawa et al. | |

(Continued)

FOREIGN PATENT DOCUMENTS

JP   2018113146 A   7/2018

OTHER PUBLICATIONS

European Search Report dated Jun. 24, 2021 in corresponding EP application No. 21156295.4.

*Primary Examiner* — Abdullah A Riyami
*Assistant Examiner* — Nelson R. Burgos-Guntin
(74) *Attorney, Agent, or Firm* — Hayes Soloway P.C.

(57) ABSTRACT

According to an embodiment, a housing of a high-speed transmission connector fitted to a connector of a counterpart substrate via a frontage. The housing of the first aspect includes: a bottom plate forming a bottom of the frontage and being provided with at least one boss on a surface opposite to the frontage side; a pair of first side walls facing each other in a first direction with the frontage sandwiched therebetween; and a pair of second side walls facing each other in a second direction orthogonal to the first direction with the frontage sandwiched therebetween. The bottom plate is provided with first through holes for tolerance measurement having inner peripheral surfaces including side wall surfaces of the first side walls in the same planes and/or second through holes for tolerance measurement having inner peripheral surfaces including side wall surfaces of the second side walls in the same planes.

6 Claims, 18 Drawing Sheets

(56) References Cited

U.S. PATENT DOCUMENTS

| | | | |
|---|---|---|---|
| 2010/0330844 A1* | 12/2010 | Ito | H01R 12/716 |
| | | | 439/660 |
| 2012/0115366 A1* | 5/2012 | Suzuki | G01R 1/07314 |
| | | | 439/626 |
| 2015/0270658 A1* | 9/2015 | Aoki | H01R 13/6461 |
| | | | 439/660 |
| 2017/0125946 A1* | 5/2017 | Horchler | H01R 12/716 |
| 2017/0250484 A1* | 8/2017 | Sagano | H01L 24/14 |
| 2018/0198222 A1 | 7/2018 | Washino et al. | |
| 2021/0044060 A1* | 2/2021 | Wu | H01R 12/724 |
| 2021/0111504 A1* | 4/2021 | Kobayashi | H01R 13/2407 |
| 2021/0126385 A1* | 4/2021 | Zhang | H01R 9/2483 |
| 2021/0175658 A1* | 6/2021 | Nakamura | G01R 31/2886 |
| 2021/0184383 A1* | 6/2021 | Ito | H01R 13/6477 |
| 2021/0378121 A1* | 12/2021 | Ito | H01R 12/7076 |

\* cited by examiner

HOUSING OF HIGH-SPEED TRANSMISSION CONNECTOR AND HIGH-SPEED TRANSMISSION CONNECTOR

CROSS-REFERENCE TO RELATED APPLICATION

This application claims the benefit of Chinese Patent application CN202010092843.4 filed on Feb. 14, 2020, the contents of which are incorporated herein by reference herein.

TECHNICAL FIELD

The present disclosure relates to a high-speed transmission connector mounted on a circuit board, in particular, to a mezzanine connector electrically connecting different circuit boards.

BACKGROUND

Among connectors for mediating high-speed transmission of signals between a circuit board and an extension substrate, there is a type of connector in which a socket type connector is mounted on a circuit board side, a plug type connector is mounted on an extension substrate side, and terminals of both connectors are electrically connected by fitting the plug type connector to the frontage of the socket type connector. This type of connector is called as, e.g., a mezzanine connector.

As an example of documents disclosing a technique to this type of connector, Japanese Patent Application Publication No. 2018-113146 (hereinafter referred to as "Patent Document 1") can be taken up. The housing of the connector on the circuit board side in this document has a box-shape with one side open. The bottom surface of the housing is provided with a boss inserted into a positioning hole in a circuit board, and three floating contacts are provided at the frontage on the side opposite to the side with the boss in the housing.

In the manufacture of connectors, it is necessary to perform a measurement operation to confirm whether the dimensions of each part of the product are within the allowable tolerance range. Especially, in the mezzanine connector, in order to connect two different circuit boards to each other without fitting trouble, it is preferable to make the attachment tolerance between the connector and the circuit board and the attachment tolerance between the plug and the frontage of the socket relatively small.

In order to calculate the frontage tolerance, the distance between the center of the frontage of the housing, which is referred to as the frontage center, and the boss is an essential measurement element. However, in the case of the conventional socket type connector, since the boss is on the side opposite to the frontage of the housing and they are partitioned via the bottom plate, the frontage and the boss cannot be directly viewed at the same time.

Therefore, in the conventional measurement performance, the distance between the frontage center and the boss is measured with the following three step procedures. As shown in FIG. 8, when the housing 500 is viewed from the front side, the width D1 of the frontage 400 in the housing 500 is measured and the center thereof is defined as the frontage center FC. Next, when the housing 500 is viewed from the back side, the distance D2 between the outer side surfaces of the side walls 100a and 100b on the left side and right side is measured, the center thereof is defined as the outer shape center OC, and the difference Da between the frontage center FC and the outer shape center OC is obtained. Finally, the distance Db between the outer shape center OC and the boss 390c is measured, and the sum of the distance Da and the distance Db is defined as the distance Dc between the frontage center FC and the boss 390c.

However, according to such a three step procedures, since the tolerance of the distance between the outer shape center and the frontage center as viewed from the front side and the tolerance of the distance from the outer shape center as viewed from the back side are added to obtain the tolerance of the distance between the frontage center and the boss, there is a problem in that it is difficult to perform design with a severe tolerance.

SUMMARY

The present disclosure has been made in view of such a problem, and one of the objects is to provide a high-speed transmission connector which can be designed with a severe tolerance.

In accordance with a first aspect of the present disclosure, there is provided a housing of a high-speed transmission connector fitted to a connector of a counterpart substrate via a frontage. The housing of the first aspect includes: a bottom plate forming a bottom of the frontage and being provided with at least one boss on a surface opposite to the frontage side; a pair of first side walls facing each other in a first direction with the frontage sandwiched therebetween; and a pair of second side walls facing each other in a second direction orthogonal to the first direction with the frontage sandwiched therebetween. The bottom plate is provided with first through holes for tolerance measurement having inner peripheral surfaces including side wall surfaces of the first side walls in the same planes and/or second through holes for tolerance measurement having inner peripheral surfaces including side wall surfaces of the second side walls in the same planes.

In accordance with a second aspect of the present disclosure, there is provided a high-speed transmission connector. The connector of the second independent aspect includes: a frontage to which a connector of a counterpart substrate is fitted; a bottom plate forming a bottom of the frontage and being provided with a plurality of support holes and provided with one or a plurality of bosses on a surface opposite to the frontage side; a pair of first side walls intersecting with the bottom plate and facing each other in a first direction with the frontage sandwiched therebetween; and a pair of second side walls intersecting with the bottom plate and facing each other in a second direction orthogonal to the first direction with the frontage sandwiched therebetween. The bottom plate includes: a housing provided with first through holes for tolerance measurement having inner peripheral surfaces including side wall surfaces of the first side walls in the same planes and/or second through holes for tolerance measurement having inner peripheral surfaces including side wall surfaces of the second side walls in same planes; and a plurality of contacts fixed to the support holes.

DETAILED DESCRIPTION

Figure 1:
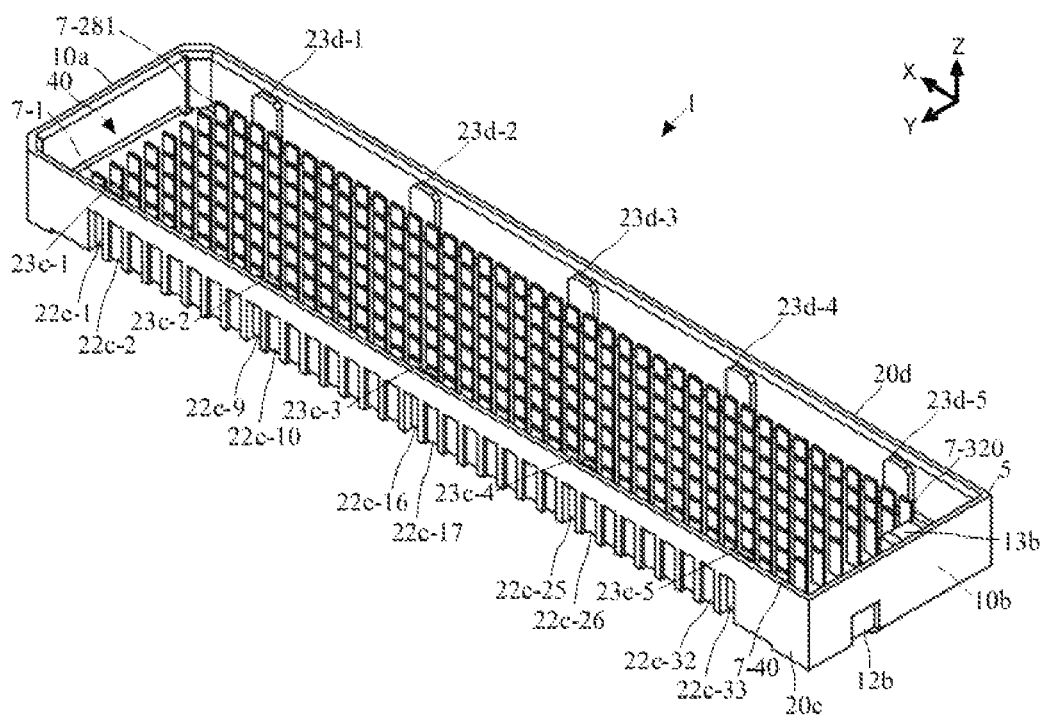
FIG. 1 is a perspective view of a high-speed transmission connector 1 including a housing 5 according to an embodiment of the present disclosure.
Figure 2:
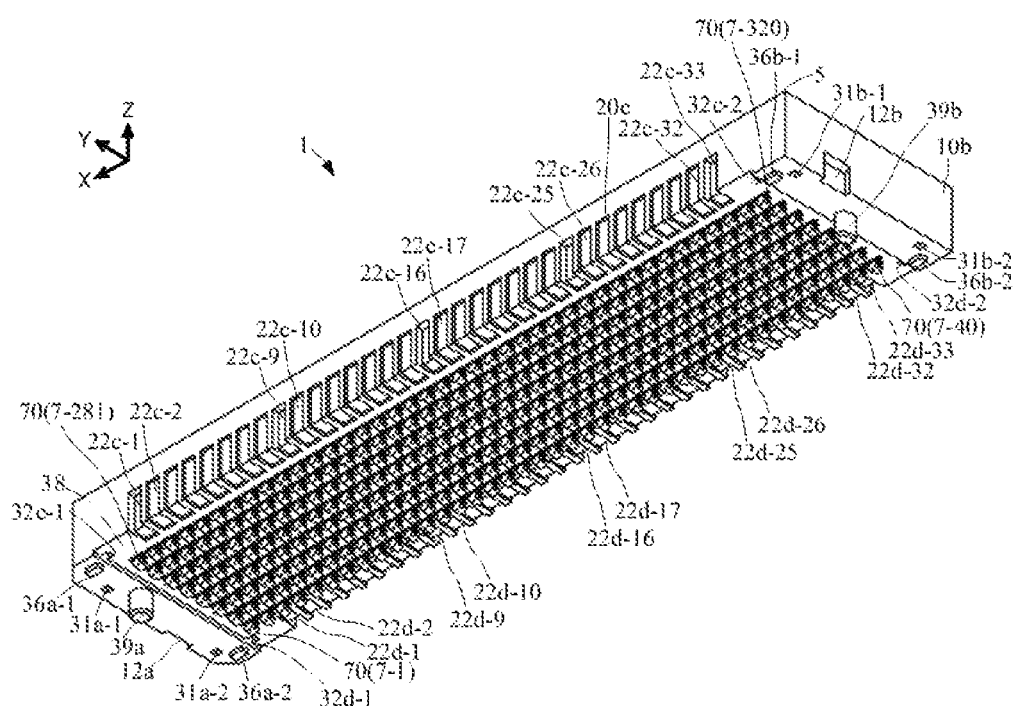
FIG. 2 is a perspective view of the high-speed transmission connector 1 of FIG. 1 as viewed from another angle.
Figure 3A:
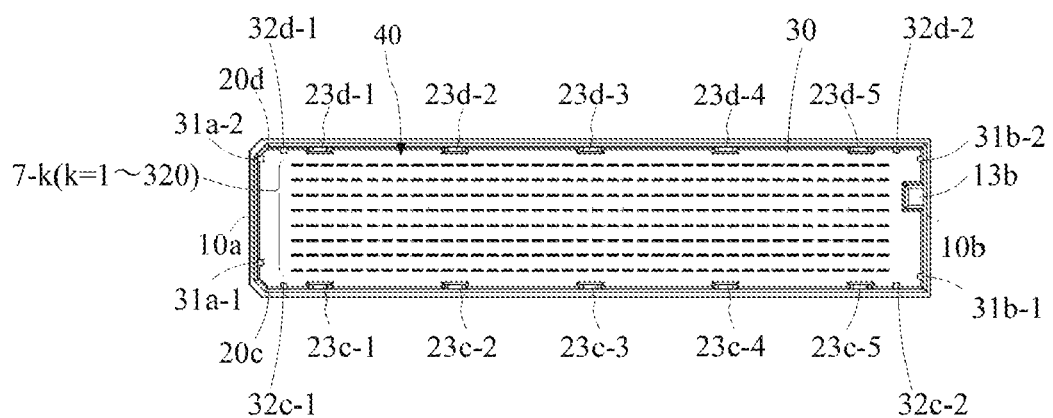
FIGS. 3A-3F are six-sided views of the high-speed transmission connector 1 of FIG. 1 and FIG. 2.
Figure 3B:
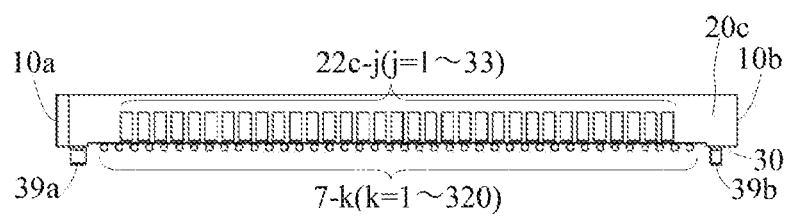
Figure 3C:
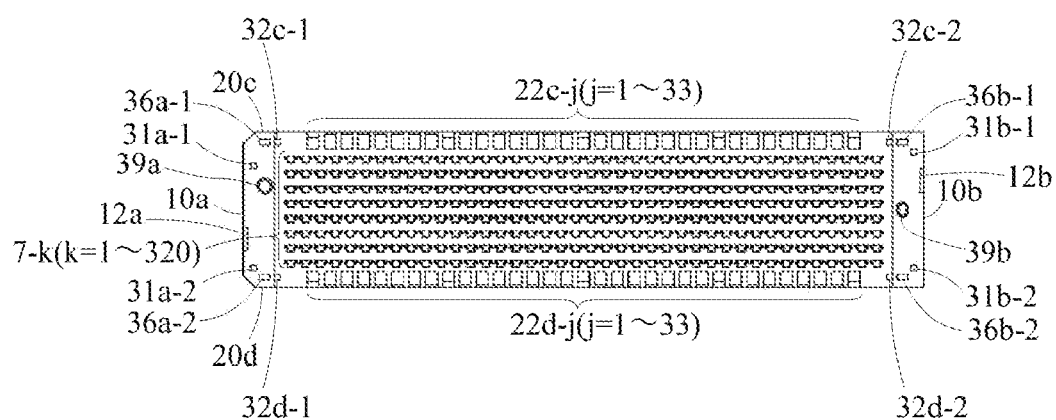
Figure 3D:
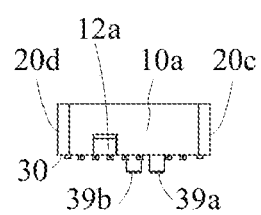
Figure 3E:
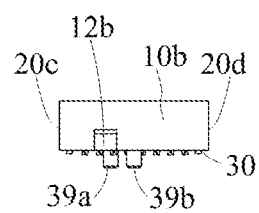
Figure 3F:
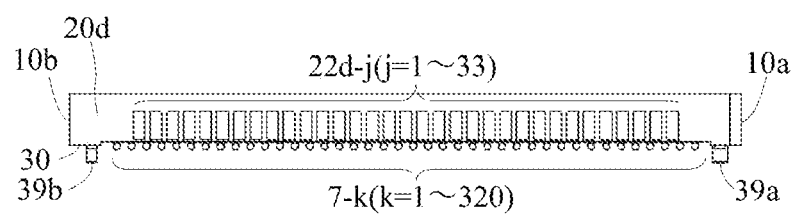
Figure 4:
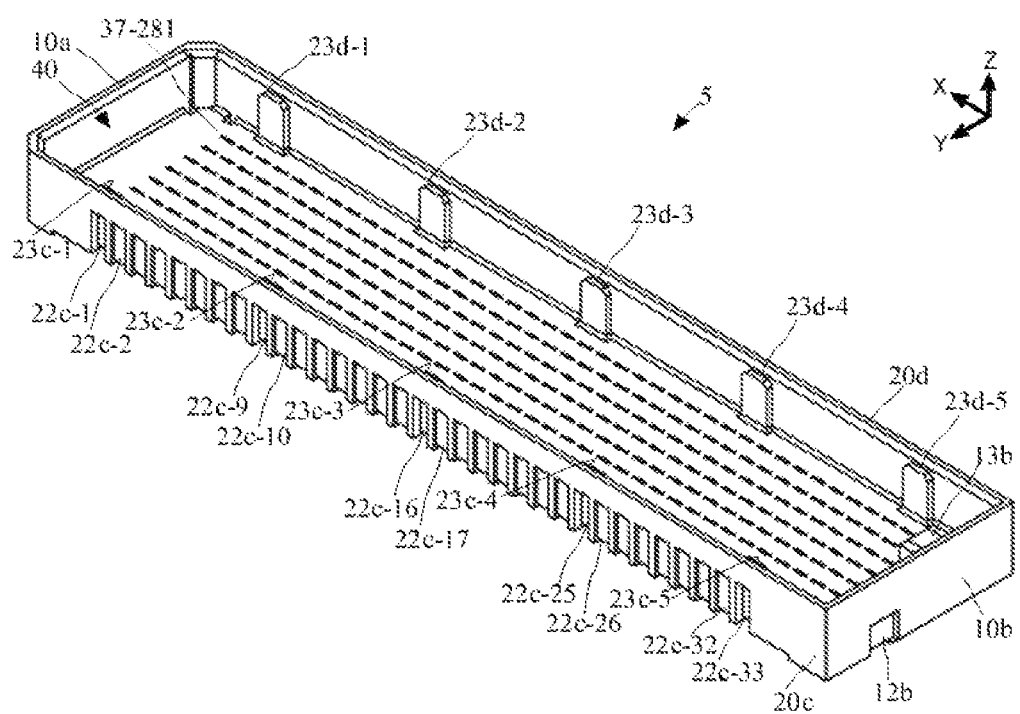
FIG. 4 is a perspective view of the housing 5 of FIG. 1.
Figure 5:
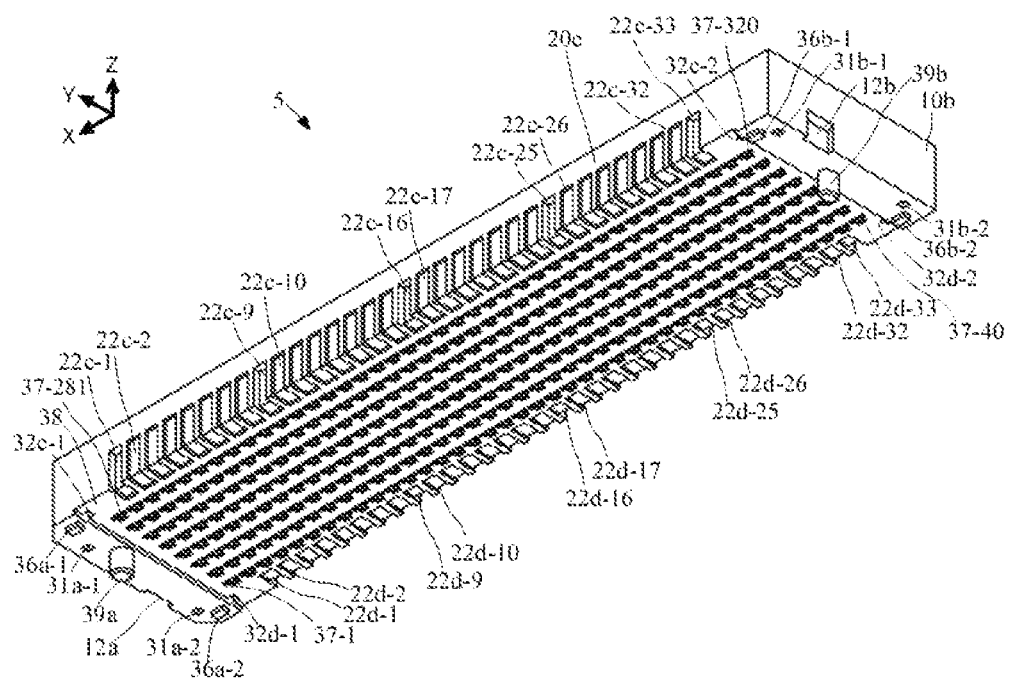
FIG. 5 is a perspective view of the housing 5 of FIG. 4 as viewed from another angle.
Figure 6A:
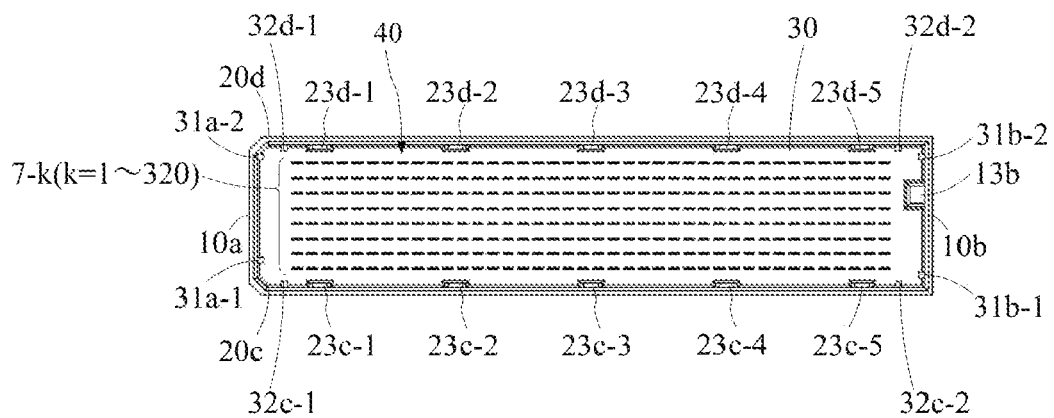
FIGS. 6A-6F are six-sided views of the housing 5 of FIG. 4 and FIG. 5.
Figure 6B:
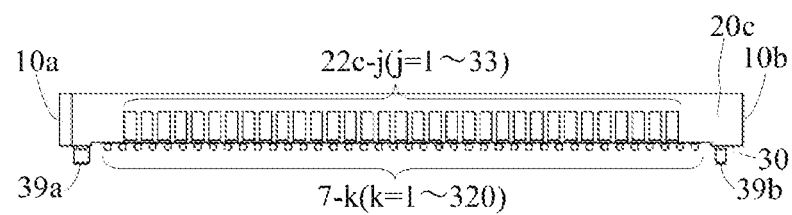
Figure 6C:
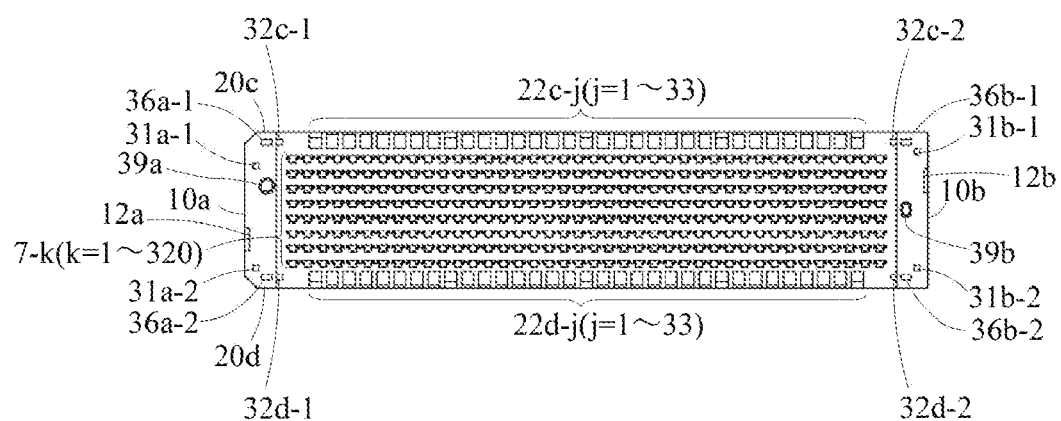
Figure 6D:
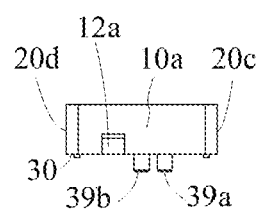
Figure 6E:
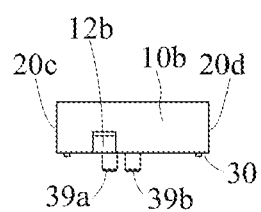
Figure 6F:
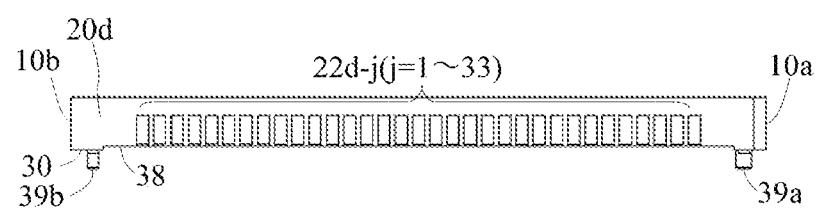

Hereinafter, a high-speed transmission connector 1 including a housing 5, which is an embodiment of the present disclosure, is explained with reference to drawings. The high-speed transmission connector 1 is used by soldering to a pad of an electronic substrate. The high-speed transmission connector 1 has a frontage 40 with a bottom. The frontage 40 of the high-speed transmission connector 1 is fitted with a header of the connector 1 of a communication counterpart substrate. When the header of the connector 1 of the communication counterpart substrate is fitted to the frontage 40 of the high-speed transmission connector 1, high-speed transmission of signals between the two substrates becomes possible.

In the following description, the fitting direction of the high-speed transmission connector 1 and the connector of the communication counterpart substrate is appropriately referred to as the Z direction, a direction orthogonal to the Z direction is appropriately referred to as the X direction, and the direction orthogonal to the Z direction and the X direction is appropriately referred to as Y direction.

As shown in FIG. 1, FIG. 2, and FIGS. 3A-3F, in the high-speed transmission connector 1, three hundred and twenty contacts 7-$j$ (j=1 to 320) are fixed in three hundred and twenty support holes 37-$j$ (j=1 to 320) of a bottom plate 30 forming a bottom of a frontage 40 in a housing 5. Each of the contacts 7-$j$ (j=1 to 320) has a fork portion formed at the end portion on the -Z side of a metal plate, and solder 70 is crimped and fixed to this fork portion. The linear portion of the contact 7-$j$ (j=1 to 320) protrudes from the support hole 37-$j$ (j=1 to 320) of the bottom plate 30 to the frontage 40 side. The solder 70 of the contact 7-$j$ (j=1 to 320) is exposed on the back surface side opposite to the frontage 40.

As shown in FIG. 4, FIG. 5, and FIGS. 6A-6F, the housing 5 has a bottom plate 30, a pair of first side walls 10a and 10b intersecting with the bottom plate 30 and facing each other in the X direction with the frontage 40 sandwiched therebetween, and a pair of second side walls 20c and 20d intersecting with the bottom plate 30 and facing each other in the Y direction with the frontage 40 sandwiched therebetween.

As shown in FIG. 5 and FIGS. 6A-6F, on the back surface of the bottom plate 30, a boss 39c is provided slightly inside the end edge on the +X side, and a boss 39d is provided slightly inside the end edge on the -X side. The boss 39c has a cylindrical shape. The boss 39d has an elliptic cylindrical shape. On the back surface of the bottom plate 30, protrusions 36a-1 and 36a-2 are provide at positions separated from the boss 39c to the +Y side and the -Y side, and protrusions 36b-1 and 36b-2 are provided at positions separated from the boss 39d to the +X side and the -X side. The rectangular portion of the back surface of the bottom plate 30 on the inner sides of the bosses 39c and 39d is slightly recessed to the +Z side as stepped portions 38. The stepped portion 38 has a support hole 37-$j$ (j=1 to 320). The support hole 37-$j$ (j=1 to 320) penetrates between the front surface and the back surface of the bottom plate 30.

The respective intersection portions between the first side wall 10a and the second side walls 20c and 20d on the +X side are chamfered, and the respective intersection portions between the first side wall 10b and the second side walls 20c and 20d on the -X side are orthogonal to each other. A first recess portion 12a is provided at a portion ranging from the outer side wall surface of the first side wall 10a on the +X side to the back surface of the bottom plate 30. A first recess portion 12b is provided at a portion ranging from the outer side wall surface of the first side wall 10b to the back surface of the bottom plate 30. A first convex portion 13b is provided on the inner side wall surface of the first side wall 10b on the -X side facing the frontage 40 side. The first convex portion 13b protrudes inward with a thickness thicker than that of the first side wall 10b.

A second recess portion 22c-$k$ (k=1 to 33) is provided at a portion ranging from the outer side wall surface of the second side wall 20c to the back surface of the bottom plate 30. A second recess portion 22d-$k$ (k=1 to 33) is provided at a portion ranging from the outer side wall surface of the second side wall 20d to the back surface of the bottom plate 30. The second recess portion 22c-$k$ (k=1 to 33) and the 22d-$k$ (k=1 to 33) are recessed in a substantially L shape.

As shown in FIG. 4 and FIGS. 6A-6F, a second convex portion 23c-$m$ (m=1 to 5) is provided on the inner side wall surface of the second side wall 20c facing the frontage 40 side. A second convex portion 23d-$m$ (m=1 to 5) is provided on the inner side wall surface of the second side wall 20d facing the frontage 40 side. The cross sections of the second convex portions 23c-$m$ (m=1 to 5) and the 23d-$m$ (m=1 to 5) have a trapezoidal shape. As shown in FIG. 5 and FIGS. 6A-6F, the bottom plate 30 are provided with the first through holes 31a-1, 31a-2, 31b-1, and 31b-2 and the second through holes 32c-1, 32c-2, 32d-1, and 32d-2 each for tolerance measurement. Among these holes, the first through holes 31a-1, 31a-2, 31b-1, and 31b-2 have inner peripheral surfaces including the inner side wall surface of the first side wall 10a in the same plane. Further, the second through holes 32c-1, 32c-2, 32d-1, and 32d-2 have inner peripheral surfaces including the inner side wall surface of the second side wall 20c in the same plane.

More specifically, the two first through holes 31a-1 and 31a-2 are located in the bottom plate 30 at positions along the first intersection line intersecting with the inner side wall surface of the first side wall 10a on the +X side, and are located at positions apart from each other on the +Y side and the -Y side. The two first through holes 31b-1 and 31b-2 are located in the bottom plate 30 at positions along the first intersection line intersecting with the inner side wall surface of the first side wall 10b on the -X side and being apart from each other on the +Y side and the -Y side.

The first through holes 31a-1, 31a-2, 31b-1, and 31b-2 penetrate between the front surface and the back surface of the bottom plate 30. The first through holes 31a-1, 31a-2, 31b-1, and 31b-2 are square-shaped. Among the four inner peripheral surfaces forming the peripheral edges of the square-shape of each of the first through holes 31a-1 and 31a-2, the inner peripheral surface on the +X side is flush with the inner side wall surface of the first side wall 10a. Among the four inner peripheral surfaces forming the peripheral edges of each of the square-shape of the first through holes 31b-1 and 31b-2, the inner peripheral surface on the −X side is flush with the inner side wall surface of the first side wall 10b. The two second through holes 32c-1 and 32c-2 are located in the bottom plate 30 at positions along the second intersection line intersecting with the inner side wall surface of the second side wall 20c on the +Y side and being apart from each other on the +X side and the −X side across the second convex portion 23c-m (m=1 to 5). The two second through holes 32d-1 and 32d-2 are located in the bottom plate 30 at positions along the second intersection line intersecting with the inner side wall surface of the second side wall 20d on the −Y side and being apart from each other on the +X side and the −X side across the second convex portion 23d-m (m=1 to 5).

The second through holes 32c-1, 32c-2, 32d-1, and 32d-2 penetrate between the front surface and the back surface of the bottom plate 30. The second through holes 32c-1, 32c-2, 32d-1, and 32d-2 are square-shaped. Among the four inner peripheral surfaces forming the peripheral edges of the square-shape of each of the second through holes 32c-1 and 32c-2, the inner peripheral surface on the +Y side is flush with the inner side wall surface of the second side wall 20c. Among the four inner peripheral surfaces forming the peripheral edges of the square-shape of each of the second through holes 32d-1 and 32d-2, the inner peripheral surface on the −Y side is flush with the inner side wall surface of the second side wall 20c.

Figure 7:
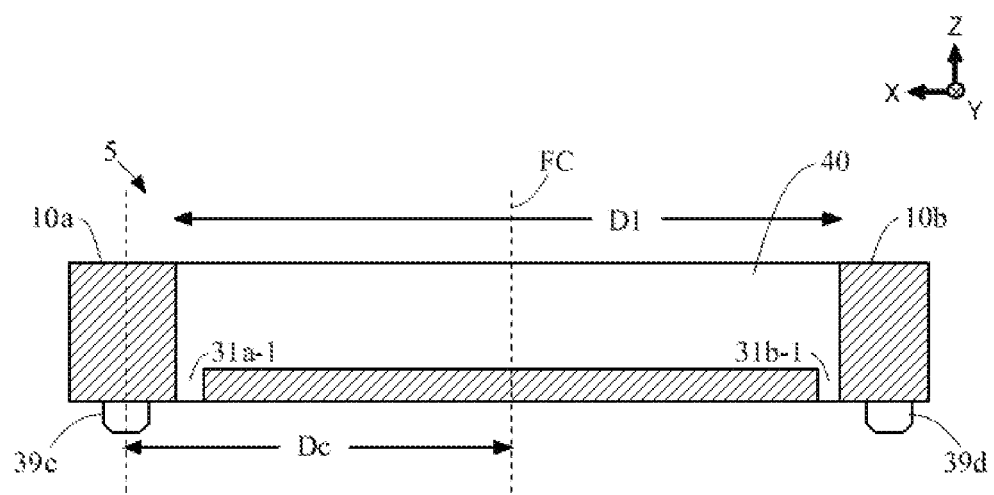
FIG. 7 is a diagram showing a procedure for measuring the distance between the frontage center FC and the boss 39c in the housing 5 of FIG. 4, FIG. 5, and FIG. 6.
Figure 8:
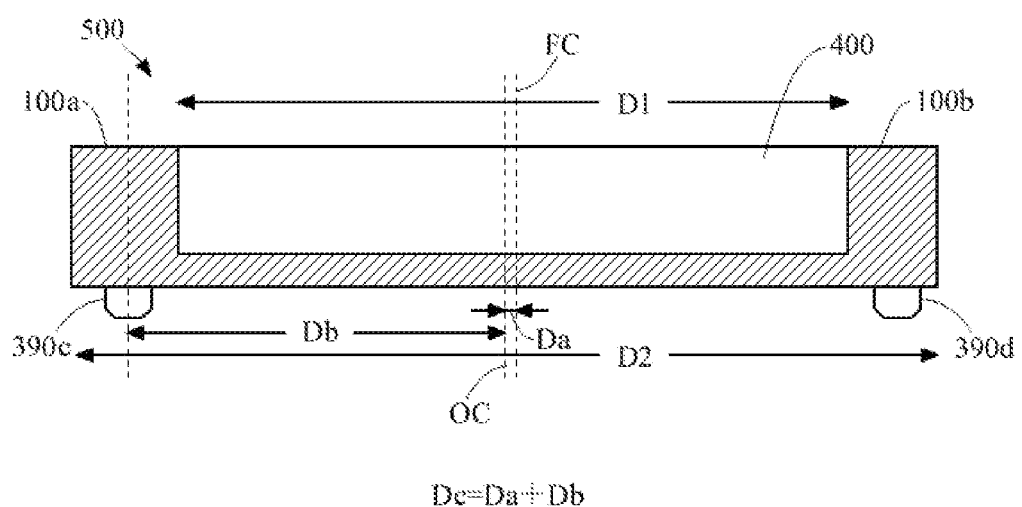
FIG. 8 is a diagram showing a procedure for measuring the distance between the frontage center FC and the boss 390c in the housing 500 of a conventional high-speed transmission connector 1.

The above is the details of the configuration of the present embodiment. The high-speed transmission connector 1 of the present embodiment includes: a bottom plate 30 forming a bottom of frontage 40 and being provided with a boss 39c on a surface opposite to the frontage 40; a pair of first side walls 10a and 10b intersecting with the bottom plate 30 and facing each other in the X direction, which is the first direction, with the frontage 40 sandwiched therebetween; and a pair of second side walls 20c and 20d intersecting with the bottom plate 30 and facing each other in the Y direction, which is the second direction, with the frontage 40 sandwiched therebetween. The bottom plate 30 are provided with first through holes 31a-1, 31a-2, 31b-1, and 31b-2 for tolerance measurement in the X direction which have inner peripheral surfaces including the side wall surfaces of the first side walls 10a and 10b in the same planes, and second through holes 32c-1, 32c-2, 32d-1, and 32d-2 for tolerance measurement in the Y direction which have inner peripheral surfaces including the side wall surfaces of the second side walls 20c and 20d in the same planes. Thus, as shown in FIG. 7, when the housing 5 is viewed from the back surface, the distance Dc between the frontage center FC and the boss 39c in the X direction can be measured by a two-step procedure consisting of measuring the distance D1 between the first through holes 31a-1 and 31b-1 facing each other in the X direction to define the central point thereof as the frontage center FC, and of measuring the distance Dc from the boss 39c to the frontage center FC. Further, the distance between the frontage center FC and the boss 39c in the Y direction can also be measured by the same two-step procedure. Therefore, it is possible to provide a high-speed transmission connector 1 which can be designed with a severe tolerance.

Although the embodiment of the present disclosure has been described above, the following modifications may be added to this embodiment.

(1) In the embodiment, the number of the contacts 7-j (j=1 to 320) may be 319 or less, and may be 321 or more.

(2) In the embodiment, it may be provided only the first through holes 31a-1, 31a-2, 31b-1, and 31b-2 at the positions along the first intersection lines intersecting with the first side walls 10a and 10b of the bottom plate 30, or only the second through holes 32c-1, 32c-2, 32d-1, and 32d-2 at positions along the second intersection lines intersecting with the second side walls 20c and 20d in the bottom plates 30.

(3) In the above embodiment, one through hole may be provided for each of the intersection lines on both sides sandwiching the frontage 40, which is common to the tolerance measurement in the X direction and the tolerance measurement in the Y direction, without separately providing the first through holes 31a-1, 31a-2, 31b-1, and 31b-2 for tolerance measurement in the X direction and the second through holes 32c-1, 32c-2, 32d-1, and 32d-2 for tolerance measurement in the Y direction. The common through holes may be provided at intersection portions where the first and second intersection lines intersecting with each other, the first intersection line intersecting with the side wall surfaces of the first side walls 10a and 10b, and the second intersection line intersecting with the side wall surfaces of the second side walls 20c and 20d. It is more preferable to provide one common through hole at each of the two corner portions of the bottom plate 30 facing each other in the diagonal direction with the frontage 40 sandwiched therebetween. Further, in this case, common through holes may have N (N=a natural number equal to or greater than 3)-angle polygonal shapes including the first inner peripheral surfaces including the side wall surfaces of the first side walls 10a and 10b in the same planes and the second inner peripheral surfaces including the side wall surfaces of the second side walls 20c and 20d in the same planes. For example, when the common through hole has a quadrangular shape, among the four inner peripheral surfaces forming the peripheral edges of the quadrangular shape of the common through hole, the inner peripheral surface on the +X side (or the −X side) may be flush with the side wall surface of the first side wall 10a (or the first side wall 10a), and among the four inner peripheral surfaces, and the inner peripheral surface on the +Y side (or the −Y side) may be flush with the side wall surface of the second side wall 20c (or the second side wall 20d).

What is claimed is:

1. A housing of a high-speed transmission connector fitted to an external connector of a counterpart substrate via a frontage, the housing comprising:
    a bottom plate forming a bottom of the frontage and being provided with at least one boss on a surface opposite to the frontage side;
    a pair of first side walls facing each other in a first direction with the frontage sandwiched therebetween; and
    a pair of second side walls facing each other in a second direction orthogonal to the first direction with the frontage sandwiched therebetween,
    wherein
    the bottom plate is provided with first through holes for tolerance measurement comprising inner peripheral surfaces flush with inner side wall surfaces of the first side walls and/or second through holes for tolerance measurement comprising inner peripheral surfaces flush with inner side wall surfaces of the second side walls, and
    wherein in at least one of either the first through holes or second through holes are provided with no contact therein.

2. The housing of the high-speed transmission connector according to claim 1, wherein the first through holes are provided at a position along a first intersection line intersecting with the side wall surface of one first side wall of the pair of first side walls, and at a position along a first intersection line intersecting with the side wall surface of the other first side wall of the pair of first side walls, respectively.

3. The housing of the high-speed transmission connector according to claim 1, wherein the second through holes are provided at a position along a second intersection line intersecting with the side wall surface of one second side wall of the pair of second side walls, and at a position along a second intersection line intersecting with the side wall surface of the other second side wall of the pair of second side walls, respectively.

4. The housing of the high-speed transmission connector according to claim 1, wherein the first through hole and the second through hole are one common through hole provided at an intersection portion where the first intersection line intersecting with the side wall surface of the first side wall and the second intersection line intersecting with the side wall surface of the second side wall intersect each other, and the common through hole is in a polygonal shape which comprises a first inner peripheral surface comprising the side wall surface of the first side wall in a same plane and a second inner peripheral surface comprising the side wall surface of the second side wall in a same plane.

5. The housing of the high-speed transmission connector according to claim 1, wherein bosses are provided on both sides of the surface on the opposite side of the bottom plate separated in the first direction with the first through hole sandwiched therebetween.

6. A high-speed transmission connector, comprising:
a frontage to which a connector of an external counterpart substrate is fitted;
a bottom plate forming a bottom of the frontage and being provided with a plurality of support holes and provided with at least one boss on a surface opposite to the frontage side;
a pair of first side walls intersecting with the bottom plate and facing each other in a first direction with the frontage sandwiched therebetween; and
a pair of second side walls intersecting with the bottom plate and facing each other in a second direction orthogonal to the first direction with the frontage sandwiched therebetween,
wherein the bottom plate comprises:
a housing provided with first through holes for tolerance measurement comprising inner peripheral surfaces flush with inner side wall surfaces of the first side walls and/or second through holes for tolerance measurement comprising inner peripheral surfaces flush with inner side wall surfaces of the second side walls; and
a plurality of contacts fixed to the support holes,
and wherein at least one of either the first through holes or second through holes are provided with no contact therein.

* * * * *